United States Patent [19]

Bloom et al.

[11] 4,153,343
[45] May 8, 1979

[54] LIQUID CRYSTAL DYESTUFFS AND ELECTRO-OPTIC DEVICES INCORPORATING SAME

[75] Inventors: Allen Bloom, East Windsor; Ling K. Hung, Edison, both of N.J.

[73] Assignee: RCA Corporation, New York, N.Y.

[21] Appl. No.: 805,154

[22] Filed: Jun. 9, 1977

[51] Int. Cl.$^2$ .......................... G02F 1/13; C09K 3/34
[52] U.S. Cl. .................................. 350/349; 252/299; 252/408; 260/158; 260/156; 260/157; 350/350
[58] Field of Search ............... 252/299, 408; 350/349, 350/350, 160 LC; 260/156–158

[56] References Cited

U.S. PATENT DOCUMENTS

| | | | |
|---|---|---|---|
| 3,597,044 | 8/1971 | Castellano | 252/299 |
| 3,833,287 | 9/1974 | Taylor et al. | 252/299 |
| 3,864,022 | 2/1975 | Moriyama et al. | 252/299 |
| 3,960,750 | 6/1976 | Moriyama et al. | 252/299 |
| 3,960,751 | 6/1976 | Moriyama et al. | 252/299 |
| 4,032,470 | 6/1977 | Bloom et al. | 252/299 |
| 4,098,301 | 7/1978 | Bloom et al. | 252/299 |
| 4,116,861 | 9/1978 | Aftergut et al. | 252/299 |

FOREIGN PATENT DOCUMENTS

| | | | |
|---|---|---|---|
| 570914 | 2/1959 | Canada | 252/299 |
| 2627215 | 1/1977 | Fed. Rep. of Germany | 252/299 |
| 2631428 | 1/1978 | Fed. Rep. of Germany | 252/299 |

OTHER PUBLICATIONS

Constant, J., et al., "Pleochroic Dyes with High Order Parameters", presented at 6th Int. Liq. Cryst. Conf., Kent, Ohio (Aug. 27, 1976).
Bloom, A., et al., Mol. Cryst. Liq. Cryst., vol. 40, pp. 213-221, (1977).
Bloom, A., et al., K-12, Abstracts of the 6th Int. Liq. Cryst. Conf. (Aug. 23-27, 1976), Kent, Ohio.
White, D. L., et al., J. Appl. Phys., vol. 45, No. 11, pp. 4718-4723 (Nov. 1974).
Pavluchenko, A., et al., Mol. Cryst. Liq. Cryst. vol. 37, pp. 35-46 (1976).
Bloom, A., et al., Mol. Cryst. Liq. Cryst., (Lett.), vol. 41, pp. 1-4 (1977).

*Primary Examiner*—Benjamin R. Padgett
*Assistant Examiner*—T. S. Gron
*Attorney, Agent, or Firm*—H. Christoffersen; Birgit E. Morris; Allen Bloom

[57] ABSTRACT

Novel dyes of the formula

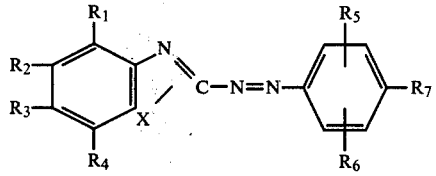

wherein X is —NH, —NCH$_3$, —S or —O; R$_1$, R$_2$, R$_3$ and R$_4$ independently at each occurrence can be hydrogen, fluoro, chloro, bromo, alkoxy, cyano, nitro, —N(R)$_2$ wherein R is alkyl or two of R$_1$ to R$_4$ together can be part of an aromatic ring; R$_5$ and R$_6$ are hydrogen, fluoro, chloro, bromo or lower alkyl; and R$_7$ is hydrogen, fluoro, chloro, bromo, alkoxy, cyano, nitro, —N(R$_2$),

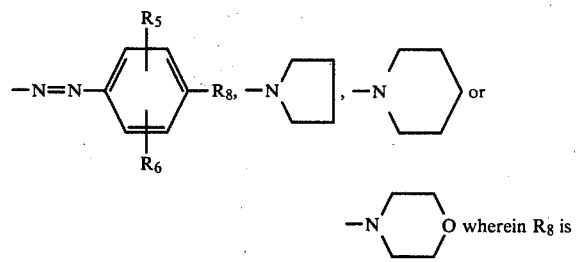

hydrogen, fluoro, chloro, bromo, alkoxy, cyano, nitro, di-alkylamino,

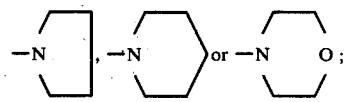

can be added to known liquid crystal compositions to impart color to the mixtures and to improve contrast of a liquid crystal electro-optic device containing such mixtures.

6 Claims, 1 Drawing Figure

U.S. Patent  May 8, 1979  4,153,343
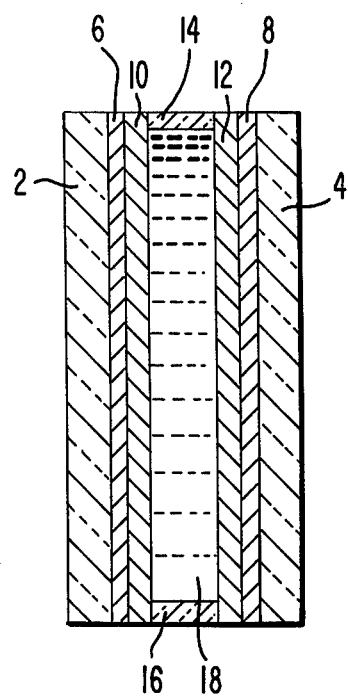

LIQUID CRYSTAL DYESTUFFS AND ELECTRO-OPTIC DEVICES INCORPORATING SAME

This invention relates to novel liquid crystal electro-optic devices. More particularly, this invention relates to liquid crystal devices containing new benzene-fused heterocyclo-substituted phenylazo dyes.

BACKGROUND OF THE INVENTION

The most popular liquid crystal cells, particularly for applications such as watch displays, are the so-called field effect liquid crystal devices. These devices employ nematic liquid crystals having positive dielectric anisotropy which align in a direction parallel to the cell's major walls in the off-state and realign in the perpendicular direction in the presence of an electric field. This effect can be viewed through crossed polarizers.

One way to improve the contrast between the on and off states is to add a liquid crystal dye that will change color when an electric field is applied. Several dyes that are soluble in nematic liquid crystals are known; 4"-cyano- or 4"-nitrobenzylidene-4'-(N,N-dialkylamino)-4-aminoazobenzenes have been disclosed in our copending application, Ser. No. 741,538, filed Nov. 12, 1976, U.S. Pat. No. 4,105,654, issued Aug. 8, 1978. These dyes have colors in the orange to red to brown hues.

Cholesteryl p-phenylazophenyl carbonates and carbamates can also be added to positive anisotropy nematic liquid crystals to impart yellow to red colors, as disclosed in our copending application, Ser. No. 642,728, filed Dec. 22, 1975, U.S. Pat. No. 4,032,470, issued June 28, 1977.

2,6-Substituted azonaphthalenes as liquid crystal dyes have been disclosed in copending application of Bloom, Ser. No. 757,374, filed Jan. 6, 1977.

White and Taylor have disclosed various pleochroic dyes that can be added to cholesteric liquid crystal hosts which undergo a phase transition to the nematic state when an electric field is applied, in particular thiazole-substituted phenylazo dyes, see *Journal of Applied Physics*, Vol. 45, 4718 (1974).

Liquid crystal dyes that can be added to nematic liquid crystals useful in field effect cells having improved contrast and in particular that have colors in the red to blue range, would be highly desirable.

SUMMARY OF THE INVENTION

We have found certain azophenyl dyes of the formula

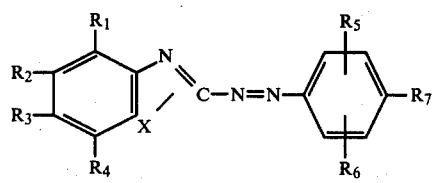

wherein $R_1$–$R_4$ independently at each occurrence can be hydrogen, fluoro, chloro, bromo, alkoxy, cyano, nitro and dialkylamino or any two of $R_1$–$R_4$ together can be part of an aromatic ring; X can be —NH, —NCH$_3$, —S or —O; $R_5$ and $R_6$ independently can be hydrogen, fluoro, chloro, bromo or a lower alkyl; and $R_7$ can be hydrogen, fluoro, chloro, bromo, alkoxy, cyano, nitro, dialkylamino,

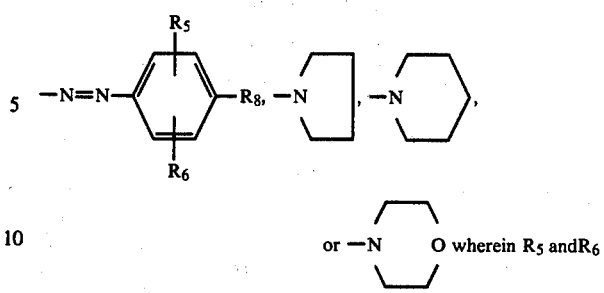

have the meanings given above and $R_8$ is hydrogen, fluoro, chloro, bromo, alkoxy, cyano, nitro, dialkylamino,

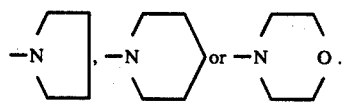

These dyes can be added in small amounts to nematic liquid crystals having positive dielectric anisotropy to impart colors in the magenta to blue range for liquid crystal cells having improved contrast.

BRIEF DESCRIPTION OF THE DRAWING

The FIGURE is a cross-sectional view of an electro-optic device embodying the invention.

DETAILED DESCRIPTION OF THE INVENTION

The azophenyl dyes of the invention are deeply colored dyes which are not liquid crystalline in themselves, but are soluble in nematic liquid crystals and can impart color and improved contrast to liquid crystal devices. Moreover, they have high order parameters which result in improved displays.

The above described dyes are prepared by diazotizing a benzoheterocycle and reacting with an appropriate substituted benzene compound. The product is isolated in known manner, as by column chromatography and recrystallization from a suitable solvent.

The dyes can be mixed with nematic liquid crystal compositions to impart a color characteristic of each dye. Low melting point nematic liquid crystal compositions, particularly p-alkoxybenzylidene-p'-alkylanilines and their mixtures with other liquid crystals and mixtures of p-alkoxy- or -acyloxybenzylidene-p'-cyanoanilines, have a transition temperature range that encompasses room temperature and are particularly suitable. The amount of dye to be added depends on the solubility of the dye in the particular liquid crystal composition employed and also on the color desired. In general, from about 0.05% by weight up to about 2% by weight of the liquid crystal mixture of the dye will be employed.

P-alkoxybenzylidene-p'-butylanilines are known liquid crystal compounds and are described for example in U.S. Pat. No. 3,829,491 which issued Aug. 13, 1974 to Strebel. Mixtures of p-methoxybenzylidene-p'-n-butylaniline (hereinafter referred to as MBBA) and p-ethoxybenzylidene-p'-n-butylaniline (hereinafter referred to as EBBA) have particularly broad and low useful temperature ranges that encompass room temperature. Mixtures containing about 35 to about 70% by weight of MBBA are preferred.

P-alkoxybenzylidene-p'cyanoanilines of the formula

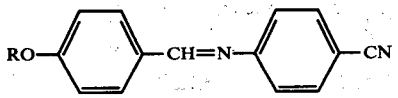

wherein R is lower alkyl are also known and are described in U.S. Pat. No. 3,499,702, issued Mar. 10, 1970, to Goldmacher et al. A mixture comprising about 85 weight percent of a 70:30 mixture of MBBA and EBBA and about 15% by weight of p-ethoxybenzylidene-p'-cyanoaniline has been described by Tarry, *Services Electronic Research Laboratory Technical Journal*, Vol. 23, No. 1, 1973. This mixture is particularly appropriate for field effect liquid crystal devices. P-acyloxy-benzylidene-p'-cyanoanilines have been disclosed by Castellano in U.S. Pat. No. 3,597,044.

In preparing an electro-optic device, liquid crystal compounds should be rigorously purified to remove ionic and nonionic impurities which may react to degrade the liquid crystal compounds either by decomposition, transubstitution reactions and the like.

In addition to the liquid crystal and dye, other additives such as homeotropic or chiral aligning agents and ionic organic compounds can also be added to the liquid crystal mixture, as is known.

Referring to the FIGURE, a liquid crystal cell is constructed from two glass plates 2 and 4 having conductive indium-doped tin oxide electrodes or coatings 6 and 8, respectively, on facing surfaces thereof. Thin silicon oxide layers 10 and 12 are evaporated onto the conductive layers 6 and 8, respectively, at an angle of 30 degrees. One-half mil (25.4 microns) thick glass frit spacers 14 and 16 maintain the coated glass plates 2 and 4 apart to complete the cell components. The cell is baked at 525° C. to melt the glass frit and seal the cell except for a fill port. The cell is filled with the desired liquid crystal composition 18 in the isotropic state and hermetically sealed with solder.

The order parameter, S, is a measure of how well a particular dyestuff aligns in a liquid crystal host and is determined according to the following equation, wherein "OD off" is the optical density in the off state and "OD on" is the optical density in the on state at an absorption maxima of the dye in a liquid crystal cell:

$$S = \frac{OD \text{ off} - OD \text{ on}}{2 \times OD \text{ on} + OD \text{ off}}$$

When S is 1, the alignment would be perfect; thus the closer to 1, the better the alignment and the greater is the contrast between the on and off states of the liquid crystal cell.

The invention will be further described in the following examples, but the invention is not meant to be limited to the details disclosed therein. In the examples percent is by weight.

EXAMPLE 1

Part A

A solution of nitrosyl sulfuric acid was prepared by admixing 0.78 gram (11 mmols) of sodium nitrite in 10 ml of concentrated sulfuric acid which was cooled to 5° C. and added slowly to a solution, cooled to 0° C., of 1.95 grams (10 mmols) of 2-amino-6-nitrobenzothiazole in a mixture of 6:1 by volume of glacial acetic acid and propionic acid. The mixture was stirred at 0°–5° C. for one hour and the excess nitrosyl sulfuric acid destroyed with sulfamic acid. The cold diazonium salt solution was added slowly to 1.5 grams (10 mmols) of N,N-diethylaniline in 40 ml of the acetic acid-propionic acid mixture at 0–5° C.

Anhydrous sodium acetate was aded to neutralize the excess mineral acid and the reaction mixture was stirred for two hours at 0°–5° C., when it was poured into 400 ml of ice water.

The resultant precipitate was filtered, washed with hot water and dried. The solid was dissolved in 50 ml of boiling benzene, filtered and the solution concentrated and chromatographed on a 250×40 mm column of silica gel using benzene as the eluant.

The product was further purified by repeated column chromatography using chloroform and ethylacetate/hexane as the eluants and then recrystallized from chloroform/hexane and ethylacetate/hexane.

A yield of 0.38 gram (11%) of the product, 2-(4'-N,N-diethylaminophenylazo)-6-nitrobenzothiazole of the formula

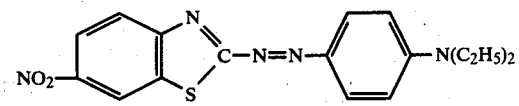

was obtained as a black solid. The structure was confirmed by elemental analysis:

Theoretical, C, 57.46%; H, 4.79%.
Found, C, 57.25%; H, 4.21%.

Part B

A positive dielectric anisotropy liquid crystal mixture was prepared by stirring together 85 weight percent of a 70:30 molar mixture of EBBA and MBBA and 15 weight percent of p-ethoxy-benzylidene-p'-cyanoaniline. The product of Part A was added to the liquid crystal to make a 0.167% by weight solution of the dye.

The liquid crystal molecules were aligned parallel to the coated glass plates of the cell. The optical density, as seen through plane polarized light parallel to the liquid crystal orientation, was measured at the visible absorption maximum (550 nm) as a function of applied voltage. At 0 volts, the optical density was 0.224. At 10 volts the optical density was 0.041.

The dye order parameter therefore was 0.598.

EXAMPLE 2

The procedure of Example 1, Part A was followed except substituting 2-amino-6-ethoxybenzothiazole as the starting material.

2-(4'-N,N-diethylaminophenylazo)-6-ethoxybenzothiazole of the formula

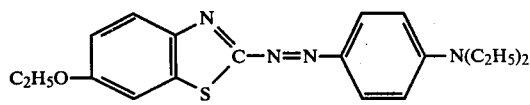

was obtained. The structure was confirmed by elemental analysis:

Theoretical, C, 64.40%; H, 6.21%,
Found, C, 63.84%; H, 6.24%.

The above dye was added to the liquid crystal mixture of Example 1, Part B as a 0.18% solution.

The optical density at teh visible absorption maximum (522 nm) was 0.599 at 0 volts and 0.122 at 10 volts.

The order parameter thus was 0.565.

EXAMPLE 3

The procedure of Example 1 was followed except substituting 2-amino-6-chloroimidazole as the starting material.

2-(4'-N,N-diethylaminophenylazo)-6-chlorimidazole having the formula

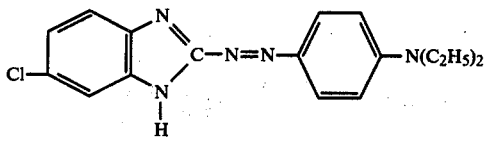

was obtained. The structure was confirmed by elemental analysis:

Theoretical, C, 62.1%; H, 5,48%,
Found, C, 62.82%; H, 5.60%.

The above dye was added to the liquid crystal mixture of Example 1, Part B as a 0.192% solution.

The optical density at the visible absorption maximum (505 nm) was 0.574 at 0 volts and 0.156 at 10 volts.

The order parameter was 0.471.

EXAMPLE 4

The procedure of Example 1 was followed except substituting 2-amino-naptho[1,2]thiazole as the starting material.

2-(4'-N,N-diethylaminophenylazo)naphto[1,2]-thiazole having the formula

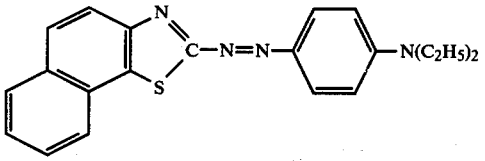

was obtained. The structure was confirmed by elemental analysis:

Theoretical, C, 70.0%; H, 5.55%.
Found, C, 69.78%; H, 5.49%.

The above dye was added to the liquid crystal mixture of Example 1, Part B as a 0.178% solution.

The optical density at the visible absorption maximum (539 nm) was 0.575 at 0 volts and 0.119 at 10 volts.

The order parameter was 0.561.

CONTROL

As a control, liquid crystal cells were prepared as in Example 1, Part B except substituting different dyes and the order parameters were measured.

2-(4'-N,N-diethylaminophenylazo)-5-chlorothiazole had an order parameter of 0.46 and 2-(4'-N,N-diethylaminophenylazo)-5-bromothiazole had an order parameter of 0.45, both less than the benzothiazole dye of Example 3.

We claim:

1. In an electro-optic device field effect liquid comprising a crystal neamtic liquid crystal composition havng positive dielectric anistropy between two electrodes, the improvement which comprises a dyestuff dissolved in said composition of the formula

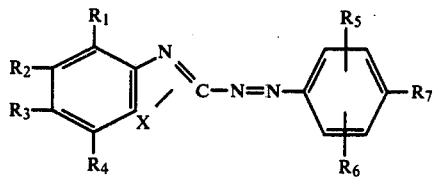

wherein $R_1$ to $R_4$ independently at each occurrence can be hydrogen, fluoro, chloro, bromo, alkoxy, cyano, nitro or dialkylamino or any adjacent two of $R_1$ to $R_4$ together can be part of an aromatic ring; X can be NH, $NCH_3$, S or O; $R_5$ and $R_6$ independently can be hydrogen, fluoro, chloro, bromo, or lower alkyl; and $R_7$ can be alkoxy, dialkylamino,

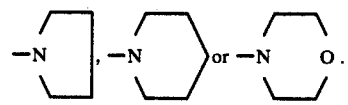

2. A device according to claim 1 wherein X is S and $R_7$ is dialkylamino.

3. A device according to claim 1 wherein X is NH and $R_7$ is diethylamino.

4. A nematic liquid crystal composition comprising a nematic liquid crystal having positive dielectric anistropy having dissolved therein a compound of the formula

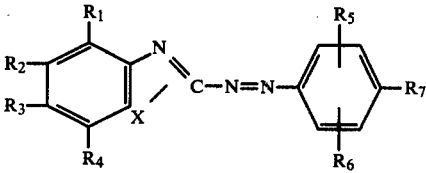

wherein $R_1$ to $R_4$ independently at each occurrence can be hydrogen, fluoro, chloro, bromo, alkoxy, cyano, nitro or dialkylamino or any adjacent two of $R_1$ and $R_4$ together can be part of an aromatic ring; X can be NH, $NCH_3$, S or O; $R_5$ and $R_6$ independently can be hydrogen, fluoro, chloro, bromo or lower alkyl; and $R_7$ can be alkoxy, dialkylamino,

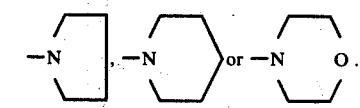

5. A composition according to claim 4 wherein the nematic liquid crystal is a mixture of p-methoxybenzylidene-p'-n-butylaniline, p-ethoxybenzylidene-p'-n-butylaniline and one or more p-alkoxybenzylidene-p'-cyanoaniline compounds having the formula

RO—⟨⟩—CH=N—⟨⟩—CN wherein R is lower alkyl.

6. A composition according to claim 5 wherein the p-alkoxybenzylidene-p'-cyanoaniline compound is p-ethoxybenzylidene-p'-cyanoaniline.

* * * * *

UNITED STATES PATENT AND TRADEMARK OFFICE
CERTIFICATE OF CORRECTION

PATENT NO. : 4,153,343

DATED : May 8, 1979

INVENTOR(S) : Allen Bloom, Ling K. Hung

It is certified that error appears in the above-identified patent and that said Letters Patent is hereby corrected as shown below:

In the Abstract

Drawing should be:

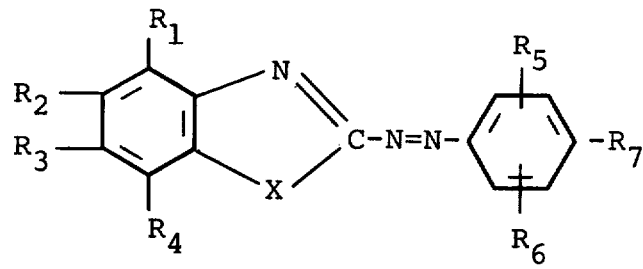

In the Specification

Col. 1, lines 52 - 59
Drawing should be:

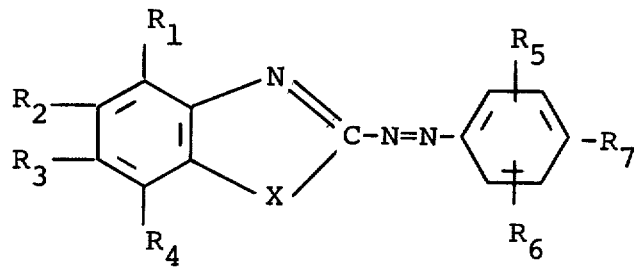

UNITED STATES PATENT AND TRADEMARK OFFICE
CERTIFICATE OF CORRECTION

PATENT NO. : 4,153,343

DATED : May 8, 1979

INVENTOR(S) : Allen Bloom, Ling K. Hung

It is certified that error appears in the above-identified patent and that said Letters Patent is hereby corrected as shown below:

Column 4, line 5    "aded" should be --added--

Column 4, line 66   "teh" should be --the--

Column 5, line 18   "5,48%" should be --5.48%--

In the Claims

1. In an electro-optic field effect liquid crystal device comprising a nematic liquid crystal composition having positive dielectric anisotropy between two electrodes, the improvement which comprises a dyestuff dissolved in said composition of the formula

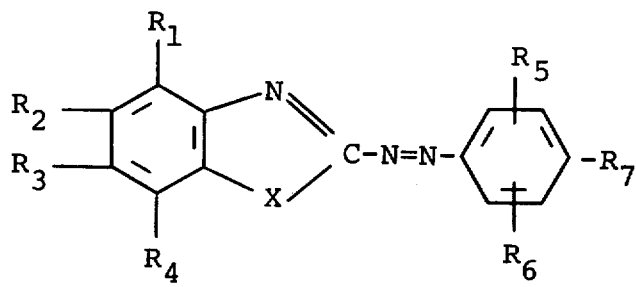

UNITED STATES PATENT AND TRADEMARK OFFICE
CERTIFICATE OF CORRECTION

PATENT NO. : 4,153,343

DATED : May 8, 1979

INVENTOR(S) : Allen Bloom, Ling K. Hung

It is certified that error appears in the above-identified patent and that said Letters Patent is hereby corrected as shown below:

wherein $R_1$ to $R_4$ independently at each occurrence can by hydrogen, fluoro, chloro, bromo, alkoxy, cyano, nitro or dialkylamino or any adjacent two of $R_1$ to $R_4$ together can be part of an aromatic ring; X can be NH, $NCH_3$, S or O; $R_5$ and $R_6$ independently can be hydrogen, fluoro, chloro, bromo, or lower alkyl; and $R_7$ can be alkoxy, dialkylamino, Claim 4, lines 31-38
Drawing should be:

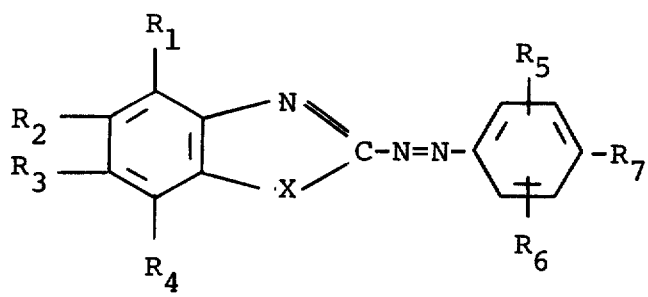

UNITED STATES PATENT AND TRADEMARK OFFICE
CERTIFICATE OF CORRECTION

PATENT NO. : 4,153,343

DATED : May 8, 1979

INVENTOR(S) : Allen Bloom, Ling K. Hung

It is certified that error appears in the above-identified patent and that said Letters Patent is hereby corrected as shown below:

Claim 4, line 41     "$R_1$ and $R_4$" should be --$R_1$ to $R_4$--

Signed and Sealed this

Sixteenth Day of October 1979

[SEAL]

Attest:

RUTH C. MASON
*Attesting Officer*

LUTRELLE F. PARKER
*Acting Commissioner of Patents and Trademarks*